United States Patent
Rizq

(10) Patent No.: US 11,447,683 B2
(45) Date of Patent: Sep. 20, 2022

(54) ASPHALTENE SOLUTION FOR WATER SHUT OFF

(71) Applicant: Saudi Arabian Oil Company, Dhahran (SA)

(72) Inventor: Ahmad Noor Al-Deen Hassan Rizq, Doha (SA)

(73) Assignee: Saudi Arabian Oil Company, Dhahran (SA)

( * ) Notice: Subject to any disclaimer, the term of this patent is extended or adjusted under 35 U.S.C. 154(b) by 76 days.

(21) Appl. No.: 16/923,889

(22) Filed: Jul. 8, 2020

(65) Prior Publication Data
US 2022/0010191 A1    Jan. 13, 2022

(51) Int. Cl.
| | | |
|---|---|---|
| *E21B 33/13* | (2006.01) | |
| *C09K 8/502* | (2006.01) | |
| *C04B 26/26* | (2006.01) | |
| *E21B 33/138* | (2006.01) | |
| *C04B 103/00* | (2006.01) | |

(52) U.S. Cl.
CPC ............. *C09K 8/502* (2013.01); *C04B 26/26* (2013.01); *E21B 33/13* (2013.01); *E21B 33/138* (2013.01); *C04B 2103/0093* (2013.01)

(58) Field of Classification Search
None
See application file for complete search history.

(56) References Cited

U.S. PATENT DOCUMENTS

| | | | |
|---|---|---|---|
| 2,213,039 A | 8/1940 | David | |
| 2,223,789 A * | 12/1940 | Limburg | E02D 19/16 |
| | | | 166/294 |
| 3,032,499 A | 5/1962 | Brown | |
| 9,074,125 B1 | 7/2015 | Lahalih | |
| 10,655,053 B2 * | 5/2020 | Rizq | C09K 8/58 |
| 11,021,647 B2 * | 6/2021 | Rizq | E21B 33/138 |
| 2008/0236845 A1 | 10/2008 | Morrow et al. | |
| 2017/0058185 A1 * | 3/2017 | Naumov | C09K 8/524 |
| 2019/0093451 A1 | 3/2019 | Al-Nakhli et al. | |
| 2019/0106615 A1 * | 4/2019 | Eluru | C09K 8/685 |
| 2019/0264090 A1 | 8/2019 | Rizq et al. | |

FOREIGN PATENT DOCUMENTS

CA    2279876    2/2000

OTHER PUBLICATIONS

PCT International Search Report and Written Opinion in International Appln. No. PCT/US2021/040816, dated Nov. 8, 2021, 15 pages.

* cited by examiner

*Primary Examiner* — Andrew Sue-Ako
(74) *Attorney, Agent, or Firm* — Fish & Richardson P.C.

(57) ABSTRACT

A method and a system for a water shut off material in a wellbore are provided. In an exemplary embodiment the water shutoff material includes a precipitate formed from a solution of asphaltene and an aqueous precipitant.

12 Claims, 3 Drawing Sheets

ASPHALTENE SOLUTION FOR WATER SHUT OFF

TECHNICAL FIELD

The present disclosure is directed to compositions for limiting co-produced water.

BACKGROUND

The production of crude oil and other hydrocarbons starts with the drilling of a wellbore into a hydrocarbon reservoir. In many cases, the hydrocarbon reservoir is a narrow layer of material in the subterranean environment, wherein other layers have high water content. Further, as a well is produced, previously productive layers may start producing higher amounts of water.

Excessive water production greatly affects the economic life of producing wells. High water cut largely affects the economic life of producing wells and is also responsible for many damage mechanisms related to oilfield equipment, such as scale deposition, fines migration, asphaltene precipitation, and corrosion. This also leads to increased operating costs to separate, treat, and dispose of the produced water according to environmental regulations.

SUMMARY

An embodiment disclosed herein provides a method for controlling unwanted water production in a water producing zone in a subterranean formation. The method includes flowing a solution of asphaltene into a wellbore such that it contacts the water producing zone, and flowing an aqueous solution into the wellbore such that it contacts the solution of asphaltene in the water producing zone, to force precipitation of the asphaltene.

Another embodiment disclosed herein provides a water shutoff material for a wellbore. The water shut off material includes a precipitate formed from a solution of asphaltene and an aqueous precipitant.

DETAILED DESCRIPTION

Figure 1:
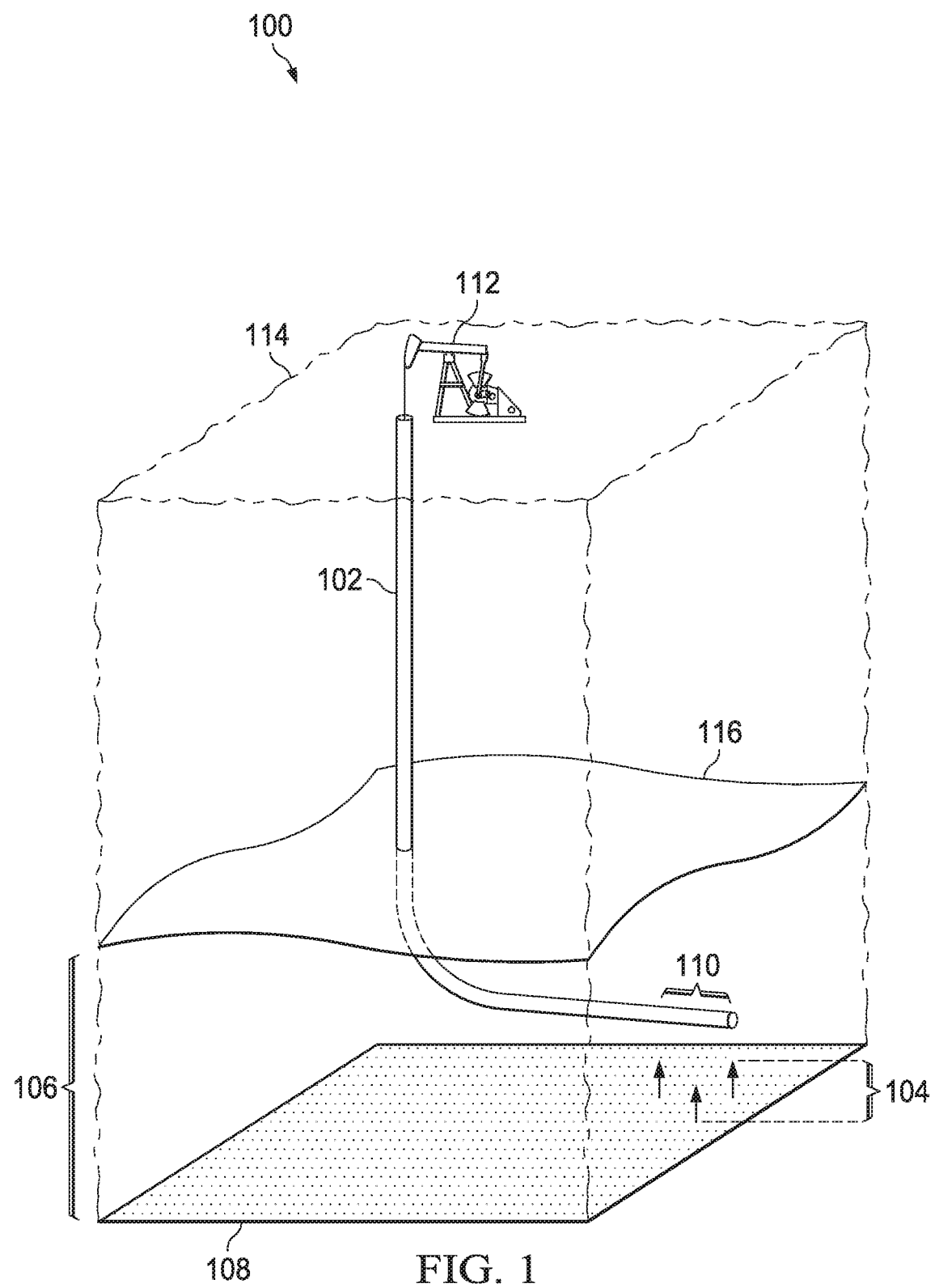
FIG. 1 is a schematic drawing of a wellbore, showing increased production of water in a reservoir layer in a subterranean formation.

Compositions are provided herein for preventing unwanted water production by shutting off water producing zones. The compositions, termed water shutoff material herein, are based on a precipitation of asphaltene from an asphaltene solution by diluting the asphaltene solution with water. As used herein, asphaltene is a complex mixture of compounds that include substantial amounts of polynuclear aromatic hydrocarbons, heteroatoms, and other materials. Asphaltene is generally isolated from the bottoms of a refinery distillation and is not generally soluble in saturated hydrocarbons. It is a primary component in asphalt. A typical elemental composition of asphaltenes is about 85% carbon, about 8% hydrogen, about 2% nitrogen, about 1.5% sulfur, and about 1.4% oxygen.

In various embodiments described herein, asphaltene is dissolved in a solvent that is miscible with water. As used herein, miscible includes solvents that form a uniform mixture with water at a sufficient concentration to force the precipitation of the asphaltenes, as well as solvents that form colloidal suspensions with water at sufficient concentrations to force the precipitation of the asphaltenes. As used herein, the water is functioning as a precipitant.

The asphaltene solution is injected into a water producing layer in the reservoir, for example, using coiled tubing or other well facility services. In some embodiments, the mixture is highly homogenous with viscosity in a medium to low range, for example, from about 20 centipoise (cP) to about 1 cP, or from about 15 cP to about 5 cP. These characteristics allow the mixture to be injected into the pores of the water production zone to seal the pores. In some embodiments, an aqueous precipitant, such as water, is then injected behind the asphaltene solution. The aqueous precipitant dilutes the solvent used for the asphaltene solution, causing the asphaltene to precipitate. This forms a solid that plugs the pores of the water production zone, preventing the production of water.

In various embodiments, amount of asphaltene used in the solution is between about 50 g asphaltene/l solvent and 500 g asphaltene/l solvent, or between about 100 g asphaltene/l solvent and 300 g asphaltene/l solvent, or about 150 g asphaltene/l solvent. The solvent includes a mixture of materials that can dissolve the asphaltenes that is also miscible with water. For example, the solvent may include a mixture of alcohols, aromatic compounds, and chlorocarbons.

In some embodiments, the alcohols include short chain alcohols, such as methanol, ethanol, propanol, butanol, or isomers, or combinations thereof. In various embodiments, the alcohols are present in a concentration of between about 5 vol. % and about 25 vol. %, or between about 10 vol. % and 20 vol. %, or about 15 vol. %. The amount of alcohol in the solvent may be determined by the composition of the asphaltene used and the desired miscibility with water.

In some embodiments, the aromatic compounds include a single aromatic ring, such as toluene or xylenes, among others. In various embodiments, the aromatic compounds are present in a concentration of between about 10 vol. % and about 30 vol. %, or between about 15 vol. % and 25 vol. %, or about 20 vol. %. Multiple aromatic compounds may be used, for example, toluene and xylenes may be used in a volume ratio of about 25/75 to a volume ratio of about 75/25, or at a volume ratio of about 50/50. Other aromatic compounds that may be used have a longer paraffinic chain off of the aromatic ring, or multiple fused aromatic rings, or both. The amount of aromatic compounds in the solvent may be determined by the composition of the asphaltene used, wherein asphaltenes with higher aromatic content may use higher concentrations of aromatic solvents.

In some embodiments, the chlorocarbons include chloroform, dichloromethane, or 1,2-dichroethane, among others. In various embodiments, the chlorocarbons are present in a concentration of between about 50 vol. % and 80 vol. %, or between about 60 vol. % and 70 vol. %, or about 65 vol. %. The amount of the chlorocarbons used in the solvent may be determined by the composition of the asphaltene used, for example, to increase the overall solubility of the asphaltenes in the solvent.

FIG. 1 is a schematic drawing 100 of a wellbore 102, showing increased production of water 104 in a reservoir layer 106 in a subterranean formation. The water 104 may come from an underlying water table, or water layer 108, below the reservoir layer 106. A section 110 of the wellbore 102 closest to the water layer 108 may draw water 104 into the wellbore 102 during the pumping cycle of a pump jack 112 at the surface 114, increasing the amount of produced water.

In other circumstances, a continuous production from the reservoir layer 106 to the surface 114 may entrain water 104 from the water layer 108, increasing the amount of water 104 produced from the section 110 of the wellbore. Further, as the reservoir layer 106 is produced, the amount of hydrocarbons between the water layer 108 and a cap rock layer 116 decreases, which may allow the water layer 108 to draw closer to the cap rock layer 116, moving closer to the section 110 of the wellbore 102. This may also increase the amount of water 104 produced.

In various embodiments described herein, an asphaltene precipitate is used to block production from the section 110 of the wellbore 102. As described further with respect to FIG. 3, in various embodiments, an asphaltene solution is injected into the wellbore 102 to the section 110 as a water shutoff material. The asphaltene solution may be pushed into the section 110, for example, through the perforations in the production tubing at that point. Water is then then be injected into the wellbore 102, diluting the solvent and forcing the precipitation of the asphaltene.

Figure 2:
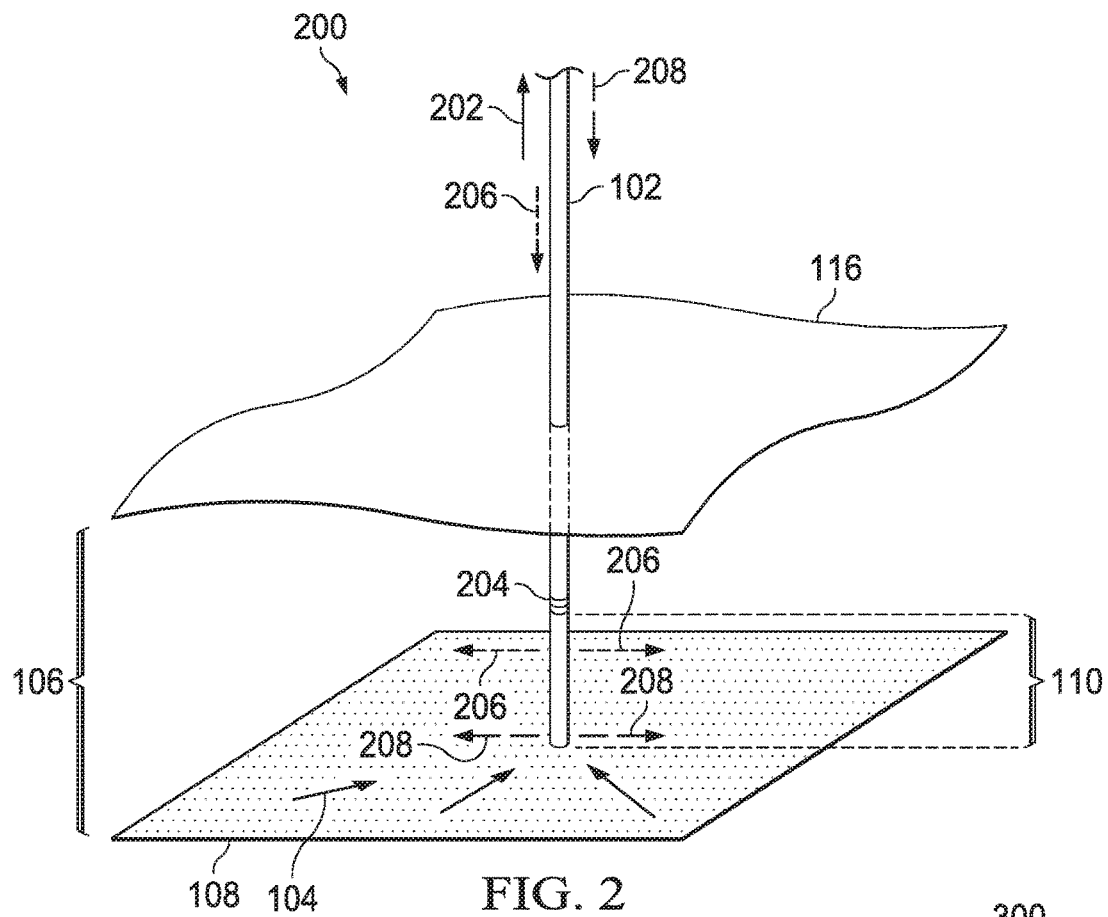
FIG. 2 is a schematic drawing of a method of sealing a section of a wellbore to decrease coproduction of water using an asphaltene precipitate.

FIG. 2 is a schematic drawing of a method 200 of sealing a section 110 of a wellbore 102 to decrease coproduction of water 104 using an asphaltene precipitate. Like numbered items are as described with respect to FIG. 1. In the example shown in FIG. 2, the wellbore 102 is shown as vertical. However, as shown in the example of FIG. 1, the wellbore can be directionally drilled into the reservoir layer 106.

The method 200 begins when the produced fluids 202 include an unacceptable amount of water 104, for example, coproduced from a water layer 108. The section 110 of the wellbore 102 closest to the water layer 108 may be responsible for the majority of the water 104 that is coproduced. Accordingly, sealing off this section 110 will lower the amount of water 104 in the produced fluids 202.

To begin, in some embodiments, a zonal isolation tool, such as a packer 204, is placed in the wellbore 102 to isolate the section 110 responsible for the majority of the production of the water 104. Once the packer 204 is in place, a solution 206 of asphaltene in a chemical solvent is injected into the wellbore 102, for example, through a coil tubing line to the section 110 that is being sealed off. In some embodiments, the solution 206 of the asphaltene is forced through the section 110 of the wellbore 102 and into the portion of the reservoir layer 106 surrounding the section 110.

After the solution 206 is injected into the wellbore 102, water 208, or a water chemical mixture, is injected through the wellbore 102 and into the section 110. The water 208 causes the precipitation of the asphaltene, for example, in the perforations of the section 110 and in the associated region of the reservoir layer 106. The formation of the asphaltene precipitate may then seal the section 110 of the wellbore 102 and the associated region of the reservoir layer 106, decreasing or eliminating the coproduction of water 104.

Once the precipitation is completed, the packer 204 may be removed from the wellbore 102. Production is restarted and the amount of water in the produced fluids 202 is determined to ensure that the sealing of the section 110 was successful.

The use of the asphaltene precipitate for shutting off regions that are producing water allows for a simpler solution than leaving packers or other zonal isolation devices in the well for long periods of time. Further, sealing of the reservoir layer 106 associated with the section 110 of the wellbore 102 allows for continuing production of lower zones without placing restrictions due to zonal isolation devices in the wellbore 102.

Figure 3:
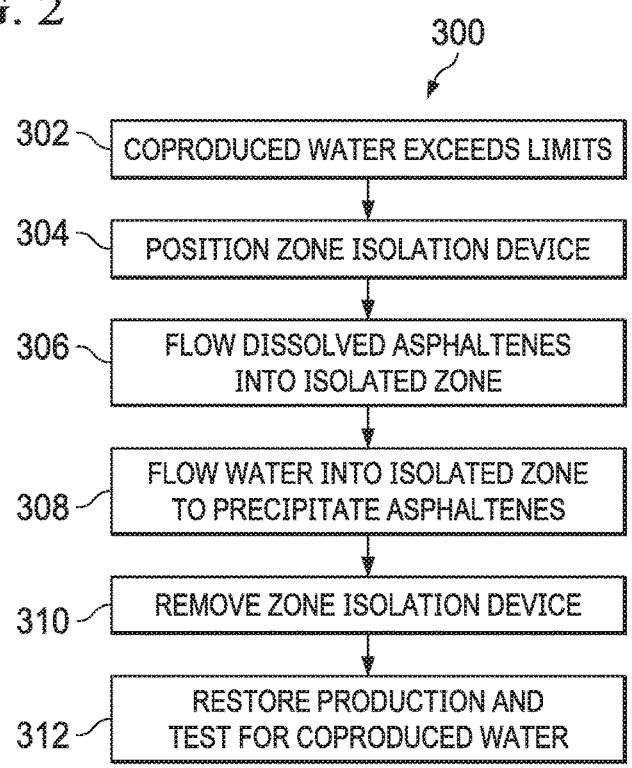
FIG. 3 is a process flow diagram of a method for shutting off water from a zone in a well.

FIG. 3 is a process flow diagram of a method 300 for shutting off water from a zone in a well. The method 300 begins at block 302 with a determination that the coproduced water has exceeded acceptable limits. For example, the coproduced water may be greater than about 1 vol. % of the produced fluids, greater than about 5 vol. %, or greater than about 25 vol. %. A determination is made as to the location, or source, of the produced water in the wellbore. This may be performed using a coil tubing in an underbalanced condition to measure the water at different locations in the wellbore to identify the section of the wellbore to be sealed.

Once the source of the produced water is identified, at block 304, a zone isolation device is placed to isolate the zone from other portions of the wellbore. The zone isolation device may be a packer, or other zonal isolation system, that is placed in the production tubing, outside the production tubing in the wellbore, or both. If the layer that is the source of the produced water is in an intermediate position in the wellbore, for example, lying both above and below productive zones, multiple zonal isolation devices may be used to isolate that portion of the wellbore for sealing.

Once the zonal isolation device is in place, at block 306, a solution of asphaltene dissolved in a chemical solvent is flowed into the isolated zone. This may be performed at sufficient pressure to push the solution of the asphaltene into the pores of the water producing layer.

In some embodiments, the chemical solvent for the asphaltene is 15 vol. % methanol, 10 vol. % xylene, 10 vol. % toluene, and 65 vol. % chloroform. As described herein, the solvent is at least partially miscible with water to allow dilution of the solvent, forcing the precipitation of the asphaltene.

At block 308, water, or an aqueous solution, is pumped into the isolated zone. The water forces the precipitation of the asphaltene, forming a solid asphaltene that seals the portion of the reservoir. In some embodiments, a surfactant is blended with the water to enhance miscibility of the water and the solvent. In some embodiments, water in the water producing zone mixes with the solvent, forcing the precipitation of the asphaltene in the pores of the zone.

At block 310, the zonal isolation device is removed. If multiple zonal isolation devices were used, for example, at the top and bottom of a layer contributing to coproduced water, they both may be removed to allow production from lower levels in the reservoir.

At block 312, production is restored and the produced fluids are tested for coproduced water. If the amount of coproduced water is still too high, the procedure may be needed for other zones in the reservoir.

EXAMPLES

Example 1: Dilution Test of Dissolved Asphaltene 150 gm of asphaltene was dissolved in 1000 ml of a mixture of 15 vol. % methanol, 10 vol. % xylene, 10 vol. % toluene, and 65 vol. % chloroform, forming the asphaltene solution. The asphaltene solution was then poured in 2000 ml water. As the chemical solvent was diluted by the water, the asphaltene precipitated, reforming a solid.

Example 2: Simulation of Water Shut Off in Core Flood Tests

A coreflood system was used to simulate the proposed technology for water shut off. The coreflood system used was a model RPS-812Z from Coretest Systems, Inc. A cylindrical core plug sample was used with a diameter of about 3.85 cm (about 1.517 in) and a length of about 7.58 cm (about 2.985 in). The coreflood system was used for permeability and porosity measurements, as well as for treating the core sample with the asphaltene. The permeability of the core plug sample was tested before treatment using the coreflood system, and had a permeability of 308 milli-Darcy's (mD).

The dissolved asphltene was injected into the core plug sample in the coreflood system at 120° C. with a backpressure of about 3450 kPa (500 psi) and a confinement pressure of about 6900 kPa (1000 psi). After the treatment, water was injected to flood the sample. As described herein, the chemical solvent was diluted by the water, causing the asphaltene to precipitate in the core plug sample.

Figure 4:
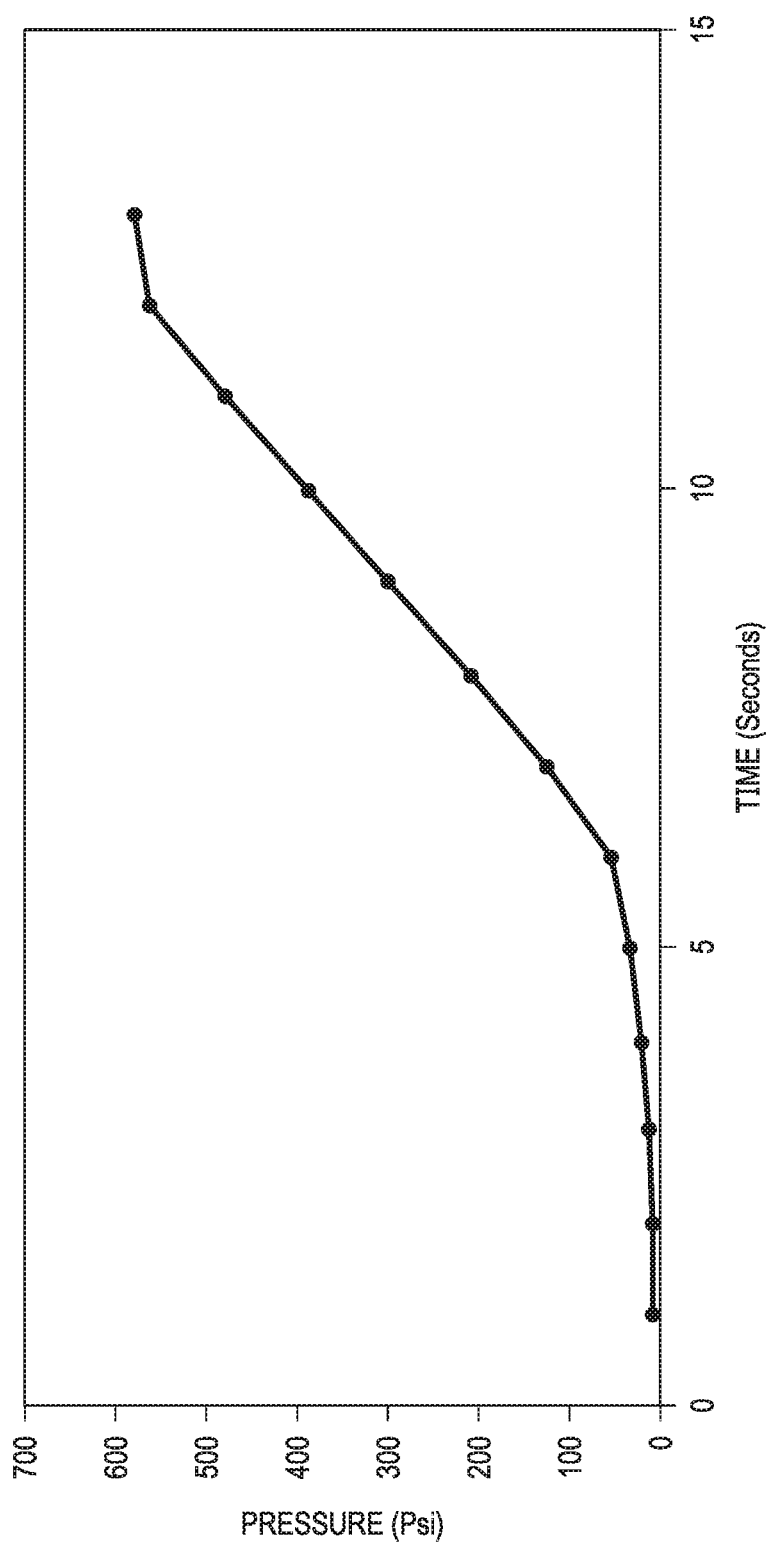
FIG. 4 is a plot of a core flood test after treatment of the core with the asphaltene solution.

FIG. 4 is a plot of a core flood test after treatment of the core with the asphaltene solution. After the treatment, a second permeability test was performed with the results shown in FIG. 4. As seen in the plot of FIG. 4, the inlet pressure of the core plug rose rapidly to maximum set point of about 4070 kPa (590 PSI). The porosity was measured at 0 mD after treatment, indicating a complete blockage.

As described herein, a solution of asphaltene in a solvent may be used for water shutoff. The solution is injected into the water producing zone, and an aqueous precipitant is injected into the water producing zone after the solution. The injection of the aqueous precipitant causes the asphaltene in the solution to precipitate sealing the pores of the water producing zone. The asphaltene is a permanent change to the water producing zone, for example, showing stability at height pressure and temperatures up to 400° C.

As described herein, the precipitation of the asphaltene provides the ability to isolate particular zones in the formation. Further, no heat source is needed to either lower the viscosity of the asphaltene solution for injection or to solidify the asphaltene after injection.

The asphaltene solution is highly homogenous with low viscosity, for example, about 1 cP to about 3 cP, which will allowed it to be injected in a long-interval length inside the water producing zone of the formation. The cost of the asphaltene and water is much less than other materials used for water shut off treatments.

An embodiment disclosed herein provides a method for controlling unwanted water production in a water producing zone in a subterranean formation. The method includes flowing a solution of asphaltene into a wellbore such that it contacts the water producing zone and flowing an aqueous solution into the wellbore such that it contacts the solution of asphaltene in the water producing zone to force precipitation of the asphaltene.

In an aspect, the aqueous solution includes water. In an aspect, the method includes determining that coproduced water exceeds acceptable limits.

In an aspect, the method includes placing a zonal isolation device above the water producing zone prior to flowing the solution of asphaltene into the wellbore. In an aspect, the method includes placing a zonal isolation device below the water producing zone prior to flowing the solution of asphaltene into the wellbore.

In an aspect, the method includes forcing the solution of asphaltene into the water producing zone. In an aspect, the method includes pumping the aqueous solution into the water producing zone after the solution of asphaltene.

In an aspect, the method includes alternating between flowing the solution of asphaltene into the water producing zone and flowing the aqueous solution into the water producing zone after the solution of asphaltene.

In an aspect, the method includes removing a zonal isolation device from above the water producing zone after the precipitation. In an aspect, the method includes removing a zonal isolation device from below the water producing zone after the precipitation.

In an aspect, the solution of asphaltene includes xylenes, toluene, or both. In an aspect, the solution of asphaltene includes surfactants. In an aspect, the aqueous solution includes a surfactant.

Another embodiment disclosed herein provides a water shutoff material for a wellbore. The water shut off material includes a precipitate formed from a solution of asphaltene and an aqueous precipitant.

In an aspect, the solution of asphaltene includes aromatic compounds. In an aspect, the aromatic compounds include toluene, or xylenes, or both. In an aspect, the aromatic compounds include an aromatic ring with an aliphatic substituent. In an aspect, the aliphatic substituent includes at least eight carbons. In an aspect, the aromatic compounds include a polynuclear aromatic hydrocarbon.

In an aspect, the solution of asphaltene includes chlorocarbons. In an aspect, the solution of asphaltene includes alcohols. In an aspect, the alcohols include methanol.

In an aspect, the aqueous precipitant includes water. In an aspect, the aqueous precipitant includes a surfactant.

Other implementations are also within the scope of the following claims.

What is claimed is:

1. A method for controlling unwanted water production in a water producing zone in a subterranean formation, comprising:
   flowing a solution of asphaltene into a wellbore such that it contacts the water producing zone; and
   flowing an aqueous solution into the wellbore such that it contacts the solution of asphaltene in the water producing zone to force precipitation of asphaltene, wherein the aqueous solution comprises a surfactant.

2. The method of claim 1, wherein the aqueous solution comprises water.

3. The method of claim 1, comprising determining that coproduced water exceeds acceptable limits.

4. The method of claim 1, comprising placing a zonal isolation device above the water producing zone prior to flowing the solution of asphaltene into the wellbore.

5. The method of claim 1, comprising placing a zonal isolation device below the water producing zone prior to flowing the solution of asphaltene into the wellbore.

6. The method of claim 1, comprising forcing the solution of asphaltene into the water producing zone.

7. The method of claim 1, comprising pumping the aqueous solution into the water producing zone after the solution of asphaltene.

8. The method of claim 1, comprising alternating:
   flowing the solution of asphaltene into the water producing zone; and flowing the aqueous solution into the water producing zone after the solution of asphaltene.

9. The method of claim 1, comprising removing a zonal isolation device from above the water producing zone after the precipitation.

10. The method of claim 1, comprising removing a zonal isolation device from below the water producing zone after the precipitation.

11. The method of claim 1, wherein the solution of asphaltene comprises xylenes, toluene, or both.

12. The method of claim 1, wherein the solution of asphaltene comprises surfactants.

* * * * *